United States Patent [19]

Sifri et al.

[11] 4,337,692
[45] Jul. 6, 1982

[54] FLUID CYLINDER ASSEMBLY HAVING MINIMIZED OUTSIDE DIAMETER

[75] Inventors: Elie C. Sifri, Gresham, Oreg.; Michael D. Schmidt, Springfield, Ohio

[73] Assignee: Cascade Corporation, Portland, Oreg.

[21] Appl. No.: 172,129

[22] Filed: Jul. 25, 1980

[51] Int. Cl.³ .............................................. F16J 15/18
[52] U.S. Cl. .......................................... 92/168; 92/52
[58] Field of Search ................. 92/168, 165 R, 51, 52, 92/53; 91/169, 168

[56] References Cited

U.S. PATENT DOCUMENTS

| 2,438,285 | 3/1948 | Houldsworth | 91/169 |
| 2,517,153 | 8/1950 | Wood | 91/169 |
| 2,740,381 | 4/1956 | Dugle | 92/168 |
| 2,783,744 | 3/1957 | Tennis | 91/53 |
| 2,923,276 | 2/1960 | Flick et al. | 92/168 |
| 3,136,221 | 6/1964 | Walker | 91/168 |
| 3,983,789 | 10/1976 | Dodt et al. | 92/168 |
| 4,087,897 | 5/1978 | Scholefield | 92/165 R |

Primary Examiner—Paul E. Maslousky
Attorney, Agent, or Firm—Chernoff & Vilhauer

[57] ABSTRACT

A fluid cylinder assembly comprising a cylindrical shell and movable plunger member having an annular retainer internally threaded into one end of the shell so as to limit the extensibility of the plunger from the shell, such annular retainer being specially designed so as to enable the outside diameter of the shell to be minimized without adversely affecting the performance of the cylinder assembly. The resilient fluid seal between the retainer and the shell, normally located at a position interior of the retainer threads, is instead located exterior of the threads at the end of the shell. The retainer includes a radially-projecting flange portion, exterior of the end of the shell, having a chamfered annular recess therein which encloses the end of the shell and resists any tendency of the end of the shell to expand radially when the force of the plunger is imposed upon the retainer by prestressing the flange against such expansion.

4 Claims, 7 Drawing Figures

FLUID CYLINDER ASSEMBLY HAVING MINIMIZED OUTSIDE DIAMETER

BACKGROUND OF THE INVENTION

This invention relates to improvements in fluid cylinder assemblies having an elongate cylinder shell and movable plunger member therein of either the piston or displacement type. More specifically, the improvement relates to means for minimizing the outside diameter of the cylinder shell without adversely affecting the performance of the cylinder assembly.

The design of fluid cylinder assemblies is determined primarily by certain basic performance requirements such as required load capacity, required length of stroke and available pressure of the fluid supply for the cylinder assembly. For example, required load capacity and available pressure determine the minimum effective diameter of the plunger member (which can be of either the piston or displacement type), and required stroke determines the minimum interior length of the cylinder shell. Although it would be ideal if the minimum outside diameter of the cylinder shell could likewise be determined by such basic performance requirements, it has unfortunately been necessary to overdesign the cylinder shell beyond the outside diameter which would be needed merely to satisfy the foregoing basic requirements. Such overdesign adds substantially to the cost and space requirement of the cylinder assembly, which is highly disadvantageous in high-quantity applications of fluid cylinders and in those cases where the available space with respect to width or length of the cylinder is limited, such as in the manufacture of lift truck masts where visibility requirements and hoist chain space requirements limit the available space for hydraulic lift cylinders.

The reason why the outside diameter of the cylinder shell has required such overdesign is related to the fact that the cylinder assembly has an annular retainer fastened to the end of the cylinder shell from which the plunger member extends, such retainer functioning primarily to limit the extensibility of the plunger member by forcibly stopping it and thereby interfering with its hyperextension. The annular retainer surrounds the plunger member forming an inwardly-protruding radial lip near the end of the shell. The plunger member has a surface (which may constitute either the rod side of a piston or an outwardly-protruding annular lip adjacent the base of a displacement-type plunger) which interferes with and cannot pass the inwardly-protruding retainer lip when the plunger member reaches full extension, thereby preventing further extension. This interference imposes a great force upon the annular retainer in the direction of extension of the plunger member, equal substantially to the force exerted by the pressurized fluid within the cylinder upon the plunger member itself. The retainer resists this force by means of its fastened connection with the end of the cylinder shell, which normally is a threaded connection.

In the past, some such retainers have been in the form of caps which fit over the end of the cylinder shell and threadably engage the exterior surface thereof. However such externally-threaded retainer structures require a substantial thickness of retainer metal protruding annularly around the exterior or peripheral surface of the end of the shell to provide necessary thread strength. This increases the effective outside diameter of the cylinder assembly significantly beyond the outside diameter of the shell itself, causing severe space problems in certain applications as mentioned above.

To reduce this space problem, many modern cylinder designs feature threads formed on the interior surface of the cylinder shell, with the annular retainer threaded internally into the shell as shown, for example, in U.S. Pat. Nos. 2,438,285, 2,517,153, 2,783,744, and 3,136,221. These internally-threaded retainer structures are now commonly used in applications where space limitations dictate minimal outside diameter of the cylinder assembly. Such internally-threaded structures as shown in the first three of the aforementioned patents, however, introduce certain stresses into the cylinder shell which are of such magnitude as to increase the required minimum thickness of the cylinder shell wall to a value significantly greater than that which would be dictated by the aforementioned basic performance requirements of the cylinder assembly. Moreover, for reasons to be explained hereafter, the minimum space which must be required between the plunger member and the interior surface of the cylinder shell in all of the aforementioned patented structures is increased by the sealing needs of the internally-threaded structure for holding the annular retainer.

The reason why the internally-threaded annular retainer has a maximizing effect on these design factors is that the high degree of longitudinal force exerted through the retainer upon the internal shell threads by the plunger member at full extension imposes a severe outward mechanical moment on the shell wall material tending to radially spread or expand the end of the shell, resulting in a phenomenon known in the industry as "bellmouthing" of the end of the shell. Excessive bellmouthing can loosen the threaded connection between the retainer and shell to the extent that the retainer can be forced out of the end of the shell under sufficient force. Accordingly, in order to resist such bellmouthing of the shell end, the shell wall either must be made significantly thicker than would be required merely to resist tensile stresses resulting from fluid pressure within the shell, or its end must be enclosed by an annular groove in the retainer as shown in the aforementioned Walker U.S. Pat. No. 3,136,221.

Even when a grooved retainer structure is used as shown in U.S. Pat. No. 3,136,221, however, the bellmouthing phenomenon still dictates the minimum distance required between the plunger member and the interior wall of the shell, thereby also influencing the outside diameter of the shell, because of the fact that a compressible, resilient fluid seal must be located between the retainer and the cylinder shell to prevent leakage through the threads. (The absence of such a seal, as in the aforementioned U.S. Pat. Nos. 2,438,285 and 3,136,221, is not acceptable for many applications such as lift trucks because of external leakage of fluid through the threads and resultant fluid losses and deposits on warehouse floors.). Compression of such a resilient seal is required to prevent leakage; moreover there can be no substantial clearance between the retainer and the shell wall in the area of the seal or the seal will gradually extrude into the clearance and thus deteriorate. If the seal were located near the end of the shell, where its presence would minimize the space required between the plunger and the interior surface of the shell, any tendency of the shell toward bellmouthing would both relieve the needed compression on the seal and permit the aforementioned harmful clearance between the shell wall and the retainer in the area of the seal. Unfortunately the tendency toward bellmouthing occurs to some degree in all previous cylinder assemblies, even those wherein the end of the shell wall is enclosed in a grooved retainer of the type shown in the aforementioned U.S. Pat. No. 3,136,221 because such a vertically-walled groove requires adequate clearance from the shell wall which it encloses to permit initial installation of the retainer. Such clearance permits sufficient bellmouthing to adversely affect the compression on any seal located near the end of the shell, and also provides a space into which the seal could eventually extrude thereby damaging it.

Accordingly, rather than being located near the end of the shell at a position exterior of the retainer threads where there would be ample room for it, the seal must instead be located more deeply within the shell at a position interior of the threads as shown, for example, in the aforementioned U.S. Pat. Nos. 2,517,153 and 2,783,744. The structure for mounting the seal at such depth requires more space than would otherwise be needed between the plunger member and the interior surface of the cylinder shell, thereby adding to the outside diameter of the entire assembly.

The aforementioned deep seal location has a further magnifying effect on the outside diameter and cost of displacement-type cylinder assemblies since, in order to install the seal within the shell at a greater depth than the internally-formed threads, such threads must be relieved (i.e. recessed) in a radially-outward direction from the deeper interior surface of the shell so that the seal may slide by the threads during installation without contacting them and being damaged by them. This relieving of the threads requires either thicker shell wall material to provide sufficient thread strength, or else a preformed outward deformation or flaring of the shell wall in the area of the threads to provide the needed relief. Making the shell wall thicker to provide such relief adds both to the cost of materal and outside diameter, while preformed outward flaring of the shell requires an annealing step which adds cost and also adds to the effective outside diameter of the shell. While such relief would always be necessary, regardless of the depth of the retainer seal location, in piston-type cylinders because of the additional requirement of passing the piston seal by the threads during initial installation of the piston, such relief could be eliminated in displacement-type cylinder assemblies having no piston seal were it not for the deep location of the retainer seal.

SUMMARY OF THE PRESENT INVENTION

The present invention eliminates the foregoing disadvantages of prior art cylinder assemblies by providing a fluid cylinder assembly having an internally-threaded annular retainer structure having a resilient fluid seal between the retainer and interior surface of the shell at a position exterior of the threads and close to the end of the shell. This change of position both reduces the space required between the interior surface of the shell and the plunger member, and eliminates the need for relieving the internal threads in displacement-type cylinder assemblies, thereby contributing to the reduction of outside shell diameter and cost.

An important factor enabling the new seal location is the effective elimination of all bellmouthing of the end of the cylinder shell and elimination of clearance between the interior surface of the shell wall and the retainer at the end of the shell, such that the seal is maintained under adequate compression and no deterioration of the seal due to extrusion into clearance spaces can occur. Such elimination of bellmouthing and clearance is accomplished by providing the internally-threaded retainer with a flange portion exterior of the shell end having an annular recess with an exterior chamfered wall which engages a matingly chamfered exterior shell surface during installation of the retainer. The engagement of the two chamfered surfaces during installation and tightening of the retainer serves to compress the end of the shell wall inwardly toward the retainer and seal, thereby prestressing the retainer flange against outward stress to provide a much higher resistance to bellmouthing and, by the compression of the shell end, ensuring adequate compression of the seal and eliminating the original machined clearances between the retainer and end of the shell wall which would otherwise create spaces into which the seal could extrude.

The reductions in cylinder shell outside diameter as a result of these improvements are significant in single-stage cylinder assemblies, and their multiple advantageous effects become multiplied in multistage cylinder assemblies.

Accordingly, it is a primary objective of the present invention to minimize the cost and space requirement of a fluid cylinder assembly by reducing the outside diameter of the cylinder assembly.

It is a further objective of the present invention to locate the resilient fluid seal between the retainer and the shell at a position exterior of the threads near the end of the shell rather than at a depth which is deeper than that of the threads so as to reduce the space required between the interior surface of the shell and the plunger member, and to eliminate the need for relieving the internal shell threads of displacement-type cylinders.

The foregoing and other objectives, features and advantages of the present invention will be more readily understood upon consideration of the following detailed description of the invention taken in conjunction with the accompanying drawings.

DETAILED DESCRIPTION OF THE INVENTION

Figure 1:
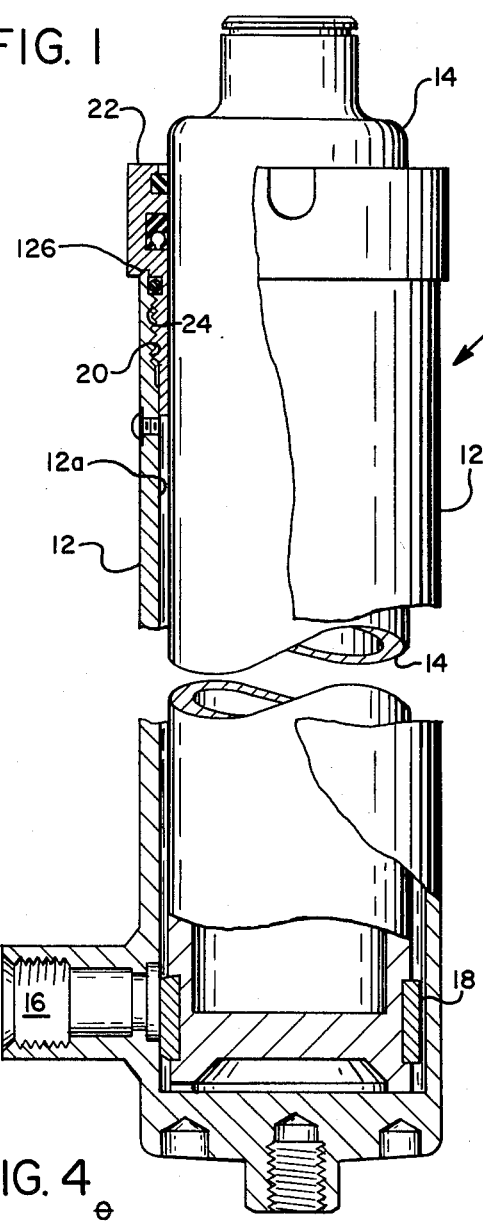
FIG. 1 is a partially sectional, extended view of an exemplary single-stage, displacement-type fluid cylinder assembly employing the present invention.
Figure 2:
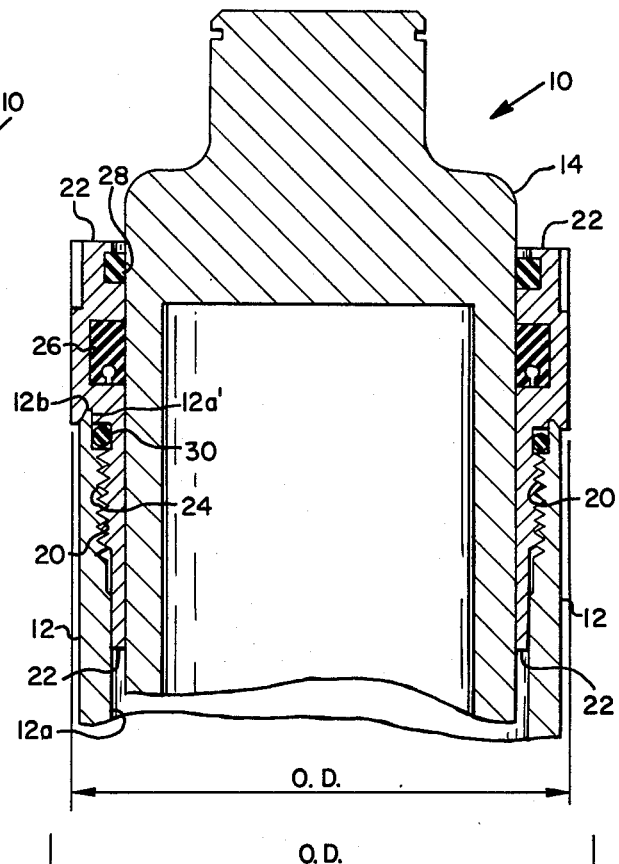
FIG. 2 is an enlarged sectional view of the top portion of the cylinder assembly of FIG. 1.
Figures 4, 5:
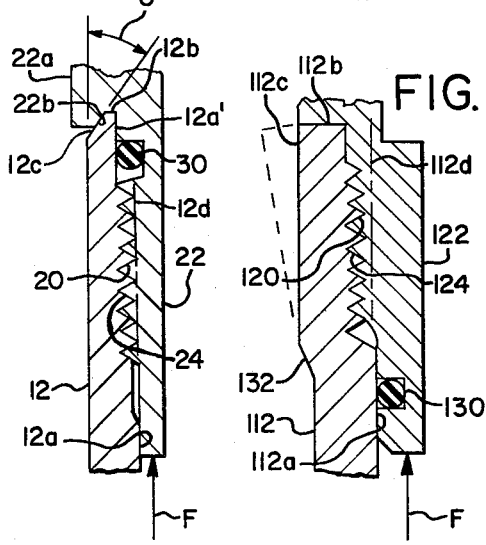
FIG. 4 is an enlarged sectional detail view of the interconnection between the annular retainer and cylinder shell of FIGS. 1 and 2.
FIG. 5 is an enlarged sectional detail view of the interconnection between the annular retainer and cylinder shell of FIG. 3.

An exemplary fluid cylinder assembly employing the present invention, indicated generally as 10, is shown in FIGS. 1, 2 and 4. The cylinder assembly 10 is of the single-stage, single-acting type, having an elongate cylindrical shell 12 and a plunger member 14 movable longitudinally within the shell 12 and extensible from the upper end thereof as seen in FIGS. 1 and 2, the lower end of the shell being closed except for a fluid port 16 through which pressurized hydraulic fluid flows into the shell to extend the plunger member 14 and is exhausted from the shell during retraction of the plunger member 14. The plunger member 14 is of the displacement type wherein fluid is allowed to flow freely between the upper and lower sides of an annular bushing 18 at the bottom of the plunger member 14. Alternatively the plunger member 14 could be of the piston type, either single or double-acting, wherein the bushing 18 is replaced by a seal which prevents the passage of hydraulic fluid in either direction past the seal.

The interior surface 12a of the shell 12 has internal threads 20 formed thereon adjacent its upper end 12b. The threads 20 do not however, extend to the upper end 12b of the shell but rather are separated from the end by a portion 12a' of the interior surface of the shell having no threads but rather forming a smooth annular surface around the interior of the shell at the end, such surface lying radially outward of the tips of the threads 20.

An annular retainer member 22, having threads 24 formed thereon, is inserted into the upper end of the shell 12 with the threads 20 and 24 respectively matingly engaged so as to detachably fasten the retainer 22 to the interior surface 12a of the shell 12, thereby preventing withdrawal of the retainer 22 from the end of the shell. As best seen in the detail drawing of FIG. 4, the retainer 22 includes a flange portion 22a located exterior of the end 12b of the shell and projecting radially outward beyond the exterior surface 12c of the shell. The flange portion 22a has an annular recess 22b formed therein which, in the course of threading the retainer 22 into the shell 12, encloses the end 12b of the shell in such a way as to resist radial expansion of the end 12b by the abutment of the outside wall of the recess 22b with the exterior surface 12c of the shell. The outer wall of the recess 22b, and the exterior surface 12c of the shell, are both chamfered, preferably at an angle $\theta$ of 30° (FIG. 4), so as to incline radially inward toward the end 12b of the shell. The engagement of the chamfered outer wall of the recess against the matingly chamfered exterior surface 12c causes an inward compression of the end of the shell wall toward the retainer 22 as the retainer is threaded into the shell, thereby providing a corresponding prestressing of the flange portion 22a against outward radial stress which could cause bellmouthing. The inward compression also substantially reduces or eliminates original machined clearances between the annular surface 12a' and the retainer 22.

The retainer 22 has conventional recesses for the usual plunger seal 26 and wiper ring 28. However the compressible resilient O-ring seal 30 between the retainer 22 and shell 12 is located in an unconventional position for a retainer which is threaded internally into a thin wall cylinder shell. Rather than being located at a position which is deeper within the shell 12 than the threads 20, the seal 30 is instead positioned at a depth less than that of the threads, i.e. between the threads 20 and the end 12b of the shell interposed between and abutting the retainer 22 and the smooth annular portion 12a' of the interior surface of the shell. This placement of the seal 30 at the end 12b of the shell would normally not be possible with an internally-threaded retainer structure because the forcible contact "F" (FIG. 4) of the top surface of the bushing 18 of the plunger member 14 against the bottom of the retainer 22 upon full extension of the plunger would normally cause sufficient radial expansion or bellmouthing of the upper end 12b of the shell to relieve enough pressure on the seal 30 to permit leakage therethrough or, alternatively, to cause enough clearance between the annular portion 12a' and the retainer 22 to permit eventual extrusion of the O-ring into the clearance thereby damaging it and permitting leakage. However, in this case, due to the inward compression of the shell end 12b and the prestressing of the retainer flange 22a against bellmouthing, such bellmouthing and seal extrusion are completely prevented thereby permitting the placement of the seal 30 externally of the threads 20 and 24.

Figure 3:
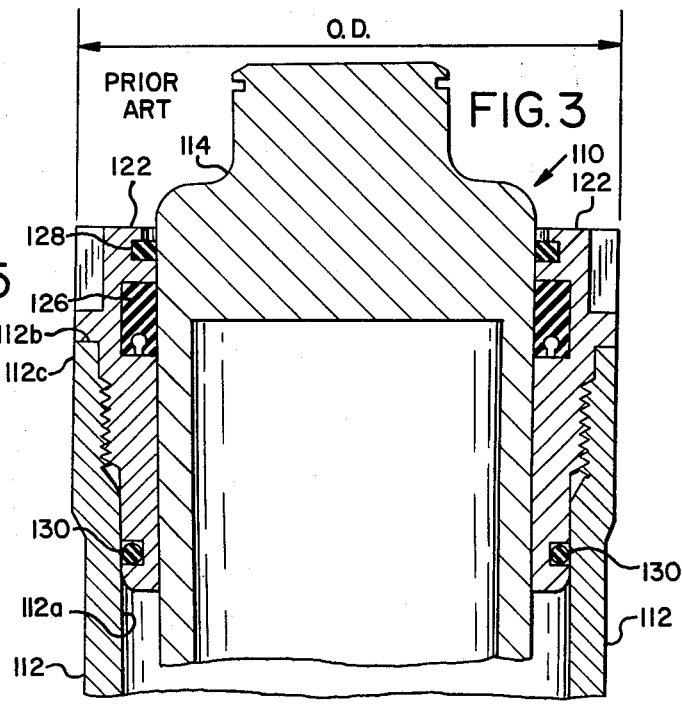
FIG. 3 is an enlarged sectional view of a displacement-type cylinder assembly of comparable performance to that of FIGS. 1 and 2 but constructed in accordance with prior art design principles.

The multiple advantages of the above-described novel cylinder structure can best be appreciated by comparison with a corresponding exemplary displacement-type structure utilized in the past as depicted in FIGS. 3 and 5 wherein the seal between the shell and retainer is positioned similar to that shown in U.S. Pat. Nos. 2,783,744 and 2,517,153. Such previous fluid cylinder assembly, indicated generally as 110, includes a cylinder shell 112, plunger member 114 and annular retainer 122 having threads 124 threaded into mating threads 120 formed on the interior surface 112a of the shell 112. The retainer 122 holds a conventional plunger seal 126 and wiper ring 128. No recess for enclosing the exterior surface 112c of the upper end of the shell 112b is provided. Accordingly, when the force "F" of the plunger 114 is exerted upwardly against the retainer 122, the force is transmitted through the threads 124 and 120, tending to radially expand the end 112b of the shell 112 as indicated in an exaggerated manner by the dotted lines in FIG. 5. However even if a nonchamfered recess of the type shown in U.S. Pat. No. 3,136,221 were employed, some bellmouthing, to a lesser degree, would still occur due to clearance between the recess and shell and lack of prestressing of the recessed retainer flange against outward expansion.

Because of the bellmouthing tendency of the shell 112, the seal 130 between the retainer 122 and shell 112 must be located at a position deeper within the shell than that of the threads 120 and 124 because any degree of bellmouthing would otherwise relieve pressure on the seal 130 if it were located nearer to the end 112b, and create clearances into which the seal could extrude, thereby permitting leakage. In order to accommodate the seal 130 at this deep position, the thickness of the retainer 122 between the interior surface 112a of the cylinder shell 112 and the plunger 114 must be considerably greater than the comparable thickness of the retainer 12 as best seen in a comparison of FIGS. 4 and 5, thereby adding to the outside diameter of the assembly.

Moreover, because the seal 130 must pass by the internal threads 120 of the shell 112 during insertion of the retainer 122, the threads 120 must be relieved radially outwardly from the plane (indicated by the phantom line 112d) of the interior surface 112a of the shell 112 to prevent the threads from damaging the seal 130 during insertion of the retainer even though the cylinder assembly 110 is of the displacement type having no piston seal which would otherwise require such thread relief. This is to be contrasted with the lack of such thread relief in the shell 12 of the displacement-type cylinder 10, again best seen in FIG. 4, where the tips of the threads 20 extend radially inwardly substantially coextensive with the plane 12d of the interior surface 12a of the shell 12. It will be noted that for shell 112 to be able to provide the needed thread relief, without removing so much material from the shell wall that the strength of the threads and the wall's resistance to bellmouthing is substantially weakened, it is necessary that the shell wall 112 be flared or deformed outwardly as shown in FIG. 5 in the area 132 just below the threads, requiring costly annealing of at least the end of the shell to soften the material preparatory to such deformation and further increasing the outside diameter of the shell.

From the foregoing discussion it is apparent that the present invention provides a significant reduction in outside diameter of cylinder shells. Minimizing of outside diameter is important in many cylinder applications where space is limited, but nowhere is it more significant than in the design of lift truck masts where operator forward visibility through the mast is so critical to safety. In such applications, even small reductions in outside diameter of a load-lifting cylinder assembly can reduce substantially the size of the blind spot normally imposed by the cylinder assembly in the operator's field of vision. Moreover, the added room provided by such reduction in outside diameter can significantly minimize the mechanical difficulties encountered in the design of masts in locating hoist chains and hydraulic hoses by allowing more space in which to position such items in close proximity to the cylinder assembly.

The benefits of the invention in this regard stem primarily from the reduction in space required between the plunger member and the interior surface of the cylinder shell, and from the elimination of the requirement of thread relieving in displacement-type cylinders (thereby also eliminating costly annealing and deformation), both due to the different placement of the seal 30 exterior of the threads. The accumulated effect of these multiple factors on outside diameter is illustrated in the comparison of the outside diameters of the cylinders of FIGS. 2 and 3 respectively. The difference is significant despite the fact that both cylinders have the same size plunger member and therefore the same basic performance. Although a small portion of the difference in outside diameters is attributable to a somewhat thicker shell wall in FIG. 3 necessary to resist extensive bellmouthing due to the lack of an enclosing recess structure on the retainer 122, the reduction in wall thickness permitted by employing such a recessed or grooved retainer would not actually reduce the effective outside diameter because of the increased diameter of the recessed retainer.

Figure 6:
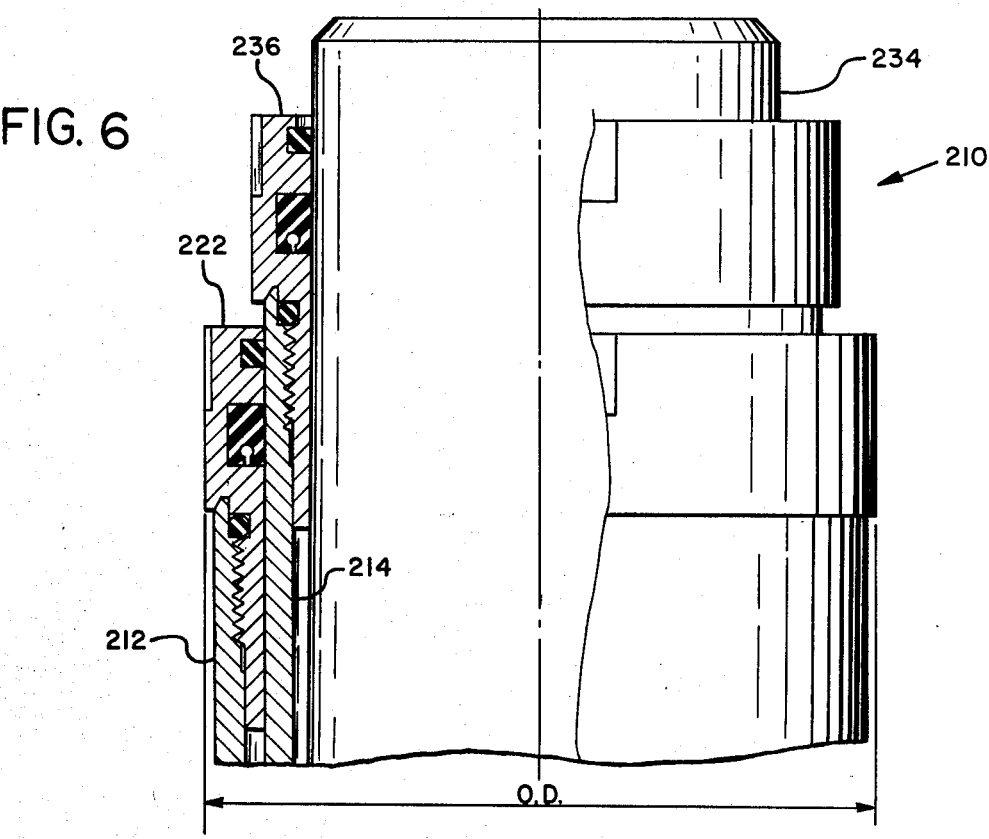
FIG. 6 is a partially sectional view of a dual-stage displacement-type fluid cylinder assembly employing the present invention.
Figure 7:
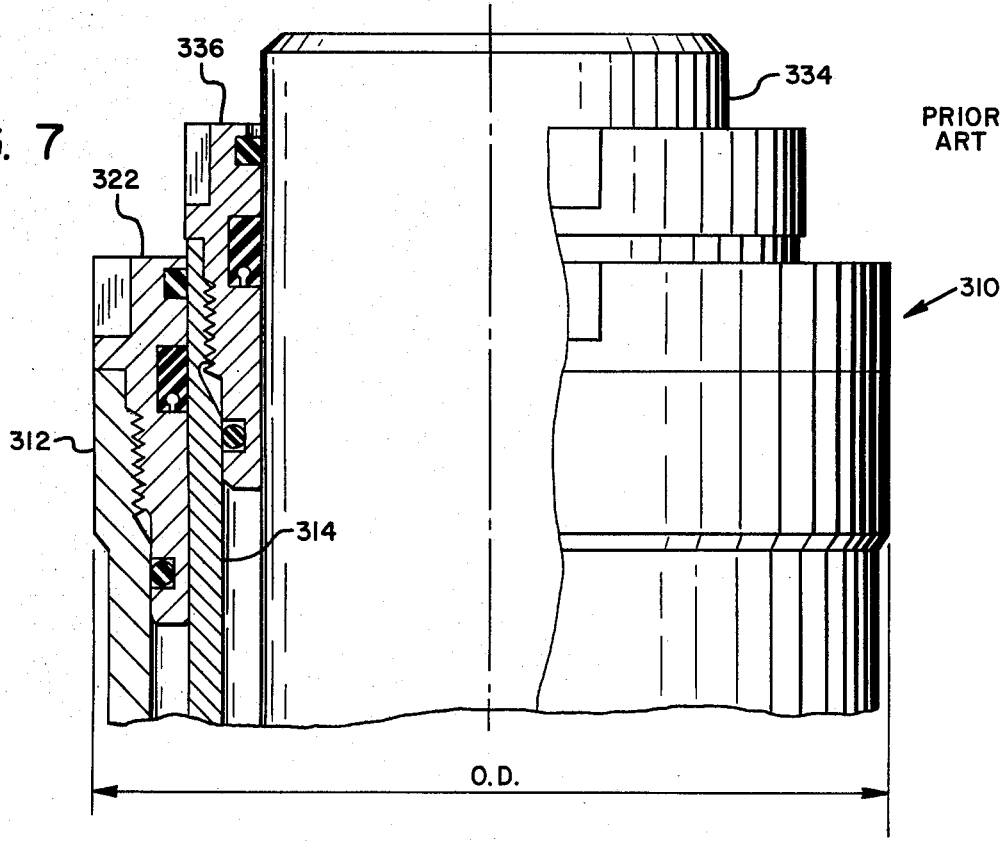
FIG. 7 is a partially sectional view of a dual-stage displacement-type fluid cylinder assembly of comparable performance to that of FIG. 6 but constructed in accordance with prior art design principles.

The difference in outside diameter becomes even more significant when two multistage cylinder assemblies of the same performance, such as the cylinder of FIG. 6 constructed according to the present invention and the cylinder of FIG. 7 constructed according to the prior art, are compared. In the cylinder assembly of FIG. 6, indicated generally as 210, a cylinder shell 212 has a plunger member 214 extensible from the upper end thereof and a retainer 222 having the same structure as retainer 12 described previously and connected to shell 212 in the same manner. Since this is a multistage cylinder assembly, the plunger member 214 itself constitutes a second cylinder shell having a second plunger member 234 extensible from its upper end and having a second retainer 236 similar in structure to retainer 222 connected to it in the same manner. Both retainers 222 and 236 feature the annular recesses into which the wall of shell 212 and the wall of plunger member 214 are inserted respectively to prevent bellmouthing thereof, together with the placement of the retainer seals exterior of the threads and the absence of thread relieving, all interacting to provide relatively narrow wall thickness and reduced outside diameter.

In contrast, the multistage cylinder assembly 310 of FIG. 7 features a cylinder shell 312, shell-type plunger member 314 and second plunger 334 separated from one another by retainers 322 and 336 respectively having structures identical to that of retainer 122 previously described. The accumulated space saving advantages afforded by retainers 222 and 236, in contrast with retainers 322 and 336, is exemplified by the substantial difference in outside diameters of the respective cylinder assemblies 210 and 310.

The terms and expressions which have been employed in the foregoing specification are used therein as terms of description and not of limitation, and there is no intention, in the use of such terms and expressions, of excluding equivalents of the features shown and described or portions thereof, if being recognized that the scope of the invention is defined and limited only by the claims which follow.

What is claimed is:

1. A fluid cylinder assembly comprising an elongate cylindrical shell having interior and exterior arcuate surfaces respectively, a plunger member movable longitudinally within said shell and extensible from one end of said shell, annular retainer means inserted within said end of said shell in surrounding relationship to said plunger member for limiting the extensibility of said plunger member from said end of said shell, mating engagement means, formed on said interior surface of said shell at a position proximate said end of said shell and upon said annular retainer means respectively, for detachably fastening said annular retainer means to said interior surface of said shell so as to prevent withdrawal of said annular retainer means from said end of said shell, and resilient seal means for preventing leakage of fluid between said annular retainer means and said interior surface of said shell, said engagement means formed on said interior surface of said shell being separated from said end of said shell by an annular portion of said interior surface having no said engagement means formed therein, said resilient seal means being interposed compressibly in a position between and abutting said annular retainer means and said annular portion of said interior surface respectively so as to be nearer to said end of said shell than any of said engagement means, said annular retainer means including a flange portion exterior of said end of said shell and projecting radially outward beyond said exterior surface of said shell at said end thereof, said flange portion having means defining a recess therein for encircling said exterior surface of said shell at said end thereof so as to resist radial expansion of said end of said shell, said recess having a wall abutting said exterior surface of said shell at said end of said shell, said wall of said recess and said exterior surface of said shell at said end of said shell both having mating surface means inclined radially inwardly toward said end of said shell for forcibly urging said shell inwardly toward said resilient seal means in response to the fastening of said annular retainer means to said interior surface of said shell by said engagement means.

2. The fluid cylinder assembly of claim 1 wherein said interior surface of said shell has a further portion which is separated from said end of said shell by said engagement means and has no engagement means formed thereon, said engagement means extending radially inwardly substantially coextensive with said further portion of said interior surface.

3. The fluid cylinder assembly of claim 2 wherein said engagement means and said further portion of said interior surface extend radially inwardly to a greater extent than does said annular portion of said interior surface.

4. The fluid cylinder assembly of claim 1 wherein said mating engagement means comprises mating helical threads.

* * * * *

UNITED STATES PATENT AND TRADEMARK OFFICE
CERTIFICATE OF CORRECTION

PATENT NO. : 4,337,692
DATED : July 6, 1982
INVENTOR(S) : Elie C. Sifri and Michael D. Schmidt It is certified that error appears in the above-identified patent and that said Letters Patent are hereby corrected as shown below:

Col. 8, line 28    Change "if" to --it--.

Signed and Sealed this

Twenty-first Day of September 1982

[SEAL]

Attest:

GERALD J. MOSSINGHOFF

Attesting Officer    Commissioner of Patents and Trademarks